(12) United States Patent
Tamamoto et al.

(10) Patent No.: US 6,343,528 B1
(45) Date of Patent: Feb. 5, 2002

(54) LOCK-UP CLUTCH CONTROLLING DEVICE OF VEHICLE DRIVING DEVICE

(75) Inventors: Yasushi Tamamoto; Nobuyuki Iwao, both of Tokyo (JP)

(73) Assignee: Isuzu Motors Limited, Tikyo (JP)

( * ) Notice: Subject to any disclaimer, the term of this patent is extended or adjusted under 35 U.S.C. 154(b) by 14 days.

(21) Appl. No.: 09/607,998

(22) Filed: Jun. 30, 2000

(30) Foreign Application Priority Data

Jun. 30, 1999 (JP) ............................................. 11-186583
Jun. 30, 1999 (JP) ............................................. 11-186584

(51) Int. Cl.$^7$ ............................................... F16H 47/00
(52) U.S. Cl. .................................................... 74/733.1
(58) Field of Search ............................ 74/733.1, 732.1, 74/333

(56) References Cited

U.S. PATENT DOCUMENTS 2,709,926 A * 6/1955 Jandasek ................... 74/733.1

* cited by examiner

*Primary Examiner*—Dirk Wright
(74) *Attorney, Agent, or Firm*—Antonelli, Terry, Stout & Kraus, LLP

(57) ABSTRACT

A vehicle driving device includes an engine installed in a vehicle, a fluid coupling actuated by the engine, and a friction clutch disposed between the fluid coupling and a transmission, the fluid coupling,having a lock-up clutch. Controlling means for controlling actuation of the lock-up clutch controls the lock-up clutch so as to be engaged during a gear change operation.

6 Claims, 9 Drawing Sheets

LOCK-UP CLUTCH CONTROLLING DEVICE OF VEHICLE DRIVING DEVICE

FIELD OF THE INVENTION

This invention relates to a vehicle driving device, and more specifically, to a lock-up clutch controlling device of a vehicle driving device having a fluid coupling equipped with a lock-up clutch.

DESCRIPTION OF THE PRIOR ART

A fluid coupling has been used as a power transmission coupling for ships, industrial machinery, and automobiles. A vehicle driving device with a fluid coupling is disclosed, for example, in Japanese Unexamined Patent Publication No. 1980-159360, and comprises an engine installed in a vehicle, the fluid coupling, a friction clutch, and a transmission which are disposed in series. The fluid coupling disposed in such a vehicle driving device can accommodate torque fluctuations and perform smooth power transmission. However, the fluid coupling inevitably involves slips between its input element (pump impeller) and its output element (turbine runner), thus resulting in a low efficiency of power transmission and a poor fuel economy. These slip-associated problems are true of a torque converter provided in an automatic transmission. A vehicle driving device equipped with a torque converter is provided with a lock-up clutch for directly connecting the input and output elements together under predetermined conditions, in order to solve the above-described problems.

In the vehicle driving device disclosed in Japanese Unexamined Patent Publication No. 1980-159360 that has the fluid coupling without a lock-up clutch, an unexpected clutch shock may occur when the friction clutch is engaged at completion of a gear change operation. Even in the vehicle driving device having the above-mentioned lock-up clutch provided in the fluid coupling, the clutch shock breaks out, if the lock-up clutch is not engaged during a gear change operation. Hereinbelow, the operating state, during gear change, of various members constituting the vehicle driving device provided with the fluid coupling will be described with reference to FIG. 9.

FIG. 9 shows an example of gear change for upshift, in which the horizontal axis shows an elapsed time during gear change. In FIG. 9, a solid line represents the clutch stroke of a friction clutch, a one-dot chain line represents the revolution speed of an engine, a two-dot chain line represents the clutch driven plate revolution speed of the friction clutch, and a dashed line represents the clutch drive plate revolution speed of the friction clutch. In FIG. 9, a gear change operation is started at a time point t1 while a vehicle is running. First of all, a driver begins to disengage the friction clutch at the time point t1, and nearly simultaneously releases an accelerator pedal. As a result, the engine revolution speed decreases as indicated by the one-dot chain line. When the driver performs an upshift operation for a transmission while the engine revolution speed is lowering, the revolution speed of a clutch driven plate indicated by the two-dot chain line is lowered to a revolution speed corresponding to the running speed of the vehicle not later than a time point t2 by the action of a synchromesh provided in the transmission, since the friction clutch is disengaged. When the operation for shifting up the transmission is completed, the driver starts engaging the friction clutch at a time point t3. At a time point t4, the friction clutch comes into a state of partial engagement. At a time point t5, the friction clutch is rapidly engaged based on a judgment that the revolution speed of the clutch driven plate and the engage revolution speed have agreed. However, a clutch drive plate of the friction clutch coupled to a turbine of a fluid coupling does not decrease in revolution speed in correspondence with the engine revolution speed, because of its own inertial force, although the engine revolution speed has lowered. Hence, a considerably great difference in revolution speed, (A), exists between the clutch drive plate and the clutch driven plate at the time point t4 when the above partial clutch engagement is achieved. Therefore, during the period from the time point t4, when the friction clutch becomes partially engaged, until the time point t5 when the friction clutch substantially becomes completely engaged, the rotation of the clutch drive plate rapidly decreases to eliminate the revolution speed difference (A). Consequently, an unexpected clutch shock develops.

SUMMARY OF THE INVENTION

The object of the present invention is to provide a lock-up clutch controlling device of a vehicle driving device equipped with a fluid coupling, the lock-up clutch controlling device being capable of preventing the occurrence of the aforementioned clutch shock at the time of engagement of a friction clutch at completion of a gear change operation.

To attain the above object, the present invention provides a lock-up clutch controlling device of a vehicle driving device, the vehicle driving device including an engine installed in a vehicle, a fluid coupling actuated by the engine, and a friction clutch disposed between the fluid coupling and a transmission, the fluid coupling having a lock-up clutch, the lock-up clutch controlling device comprising:

lock-up clutch actuating means for actuating the lock-up clutch;

gear change operation detecting means for detecting a gear change operation of the transmission; and controlling means which, based on detection signals from the gear change operation detecting means, controls the lock-up clutch actuating means so as to engage the lock-up clutch during the gear change operation.

The gear change operation detecting means may comprise clutch detecting means for detecting an engagement state of the friction clutch, and vehicle speed detecting means for detecting a running speed of the vehicle; and when the friction clutch is disengaged and the running speed of the vehicle is not less than a predetermined speed, based on detection signals from the clutch detecting means and the vehicle speed detecting means, the controlling means may judge that the gear change operation is being performed.

To attain the aforementioned object, the present invention also provides a lock-up clutch controlling device of a vehicle driving device, the vehicle driving device including an engine installed in a vehicle, a fluid coupling actuated by the engine, and a friction clutch disposed between the fluid coupling and a transmission, the fluid coupling having a lock-up clutch, the lock-up clutch controlling device comprising:

lock-up clutch actuating means for actuating the lock-up clutch;

gear change operation detecting means for detecting a gear change operation of the transmission;

clutch engagement amount detecting means for detecting an amount of engagement of the friction clutch; and controlling means for controlling the lock-up clutch actuating means based on detection signals from the gear change operation detecting means and the clutch engagement amount detecting means; and wherein:

based on the detection signals from the gear change operation detecting means and the clutch engagement amount detecting means, the controlling means engages the lock-up clutch during the gear change operation, and disengages the lock-up clutch when the amount of engagement of the friction clutch has reached a predetermined amount.

The gear change operation detecting means may comprise the clutch engagement amount detecting means, and vehicle speed detecting means for detecting a running speed of the vehicle; and when the friction clutch is disengaged and the running speed of the vehicle is not less than a predetermined speed, based on detection signals from the clutch engagement amount detecting means and the vehicle speed detecting means, the controlling means may judge that the gear change operation is being performed.

To attain the aforementioned object, the present invention further provides a lock-up clutch controlling device of a vehicle driving device, the vehicle driving device including an engine installed in a vehicle, a fluid coupling actuated by the engine, and a friction clutch disposed between the fluid coupling and a transmission, the fluid coupling having a lock-up clutch, the lock-up clutch controlling device comprising:

lock-up clutch actuating means for actuating the lock-up clutch;

gear change operation detecting means for detecting a gear change operation of the transmission;

engine revolution speed detecting means for detecting a revolution speed of the engine;

input shaft revolution speed detecting means for detecting a revolution speed of an input shaft of the transmission; and controlling means for controlling the lock-up clutch actuating means based on detection signals from the gear change operation detecting means, the engine revolution speed detecting means, and the input shaft revolution speed detecting means; and wherein:

based on the detection signals from the gear change operation detecting means, the engine revolution speed detecting means, and the input shaft revolution speed detecting means, the controlling means engages the lock-up clutch during the gear change operation, and disengages the lock-up clutch when a difference between the revolution speed of the engine and the revolution speed of the input shaft of the transmission has reached a predetermined amount.

The gear change operation detecting means may comprise clutch detecting means for detecting an engagement state of the friction clutch, and vehicle speed detecting means for detecting a running speed of the vehicle; and when the friction clutch is disengaged and the running speed of the vehicle is not less than a predetermined speed, based on detection signals from the clutch detecting means and the vehicle speed detecting means, the controlling means may judge that the gear change operation is being performed.

DETAILED DESCRIPTION OF THE PREFERRED EMBODIMENTS

The present invention will now be described in more detail with reference to accompanying drawings showing preferred embodiments of a lock-up clutch controlling device in a vehicle driving device constituted in accordance with the invention.

Figure 1:
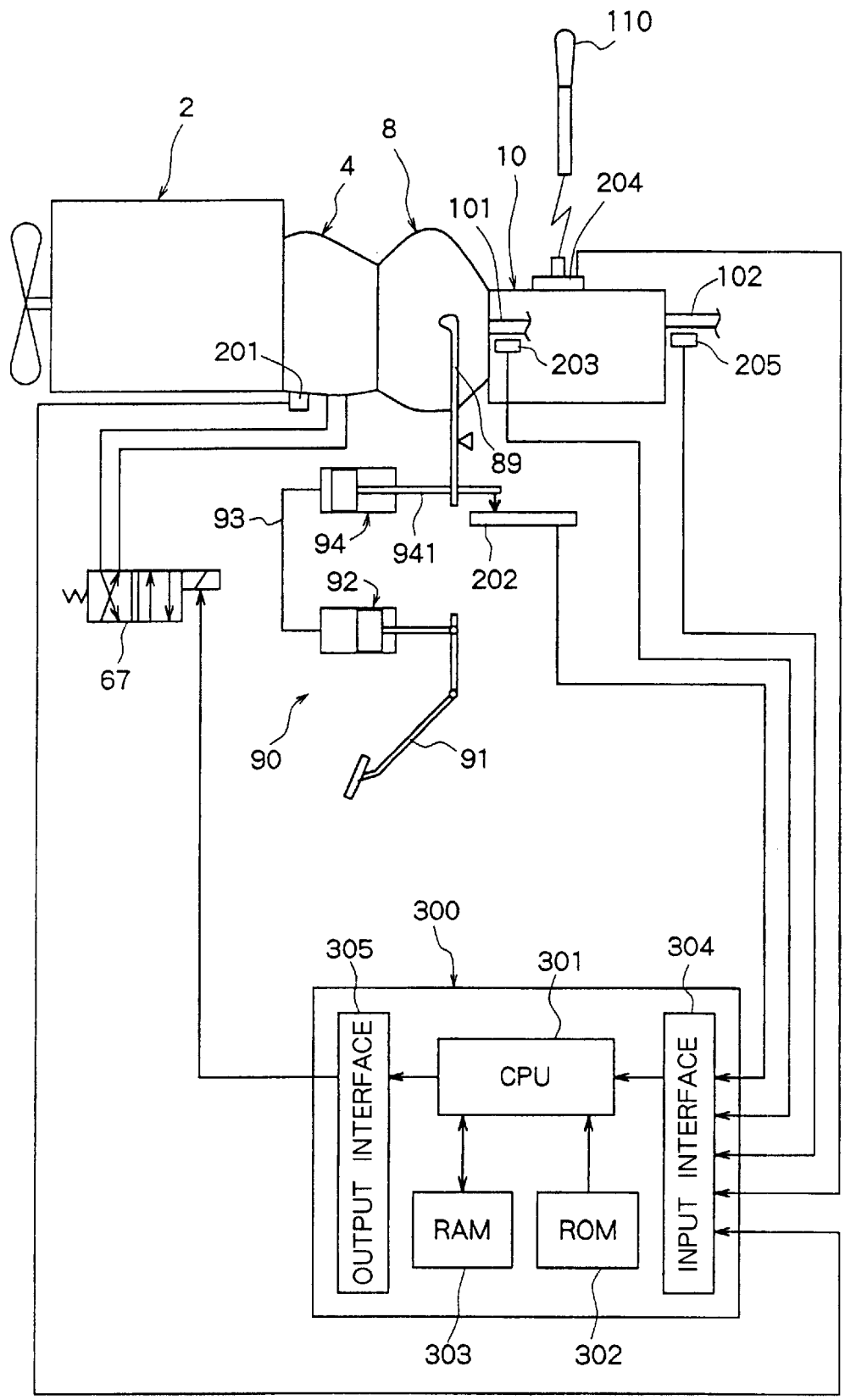
FIG. 1 is a schematic constituent block diagram showing an embodiment of a lock-up clutch controlling device of a vehicle driving device constituted in accordance with the present invention.

FIG. 1 shows an embodiment of a lock-up clutch controlling device in a vehicle driving device constituted in accordance with the present invention. The illustrated vehicle driving device is composed of an internal combustion engine 2 as a power plant, a fluid coupling 4, a friction clutch 8, and a manual transmission 10. These members are disposed in series. The internal combustion engine 2 comprises a diesel engine in the illustrated embodiment.

Figure 2:
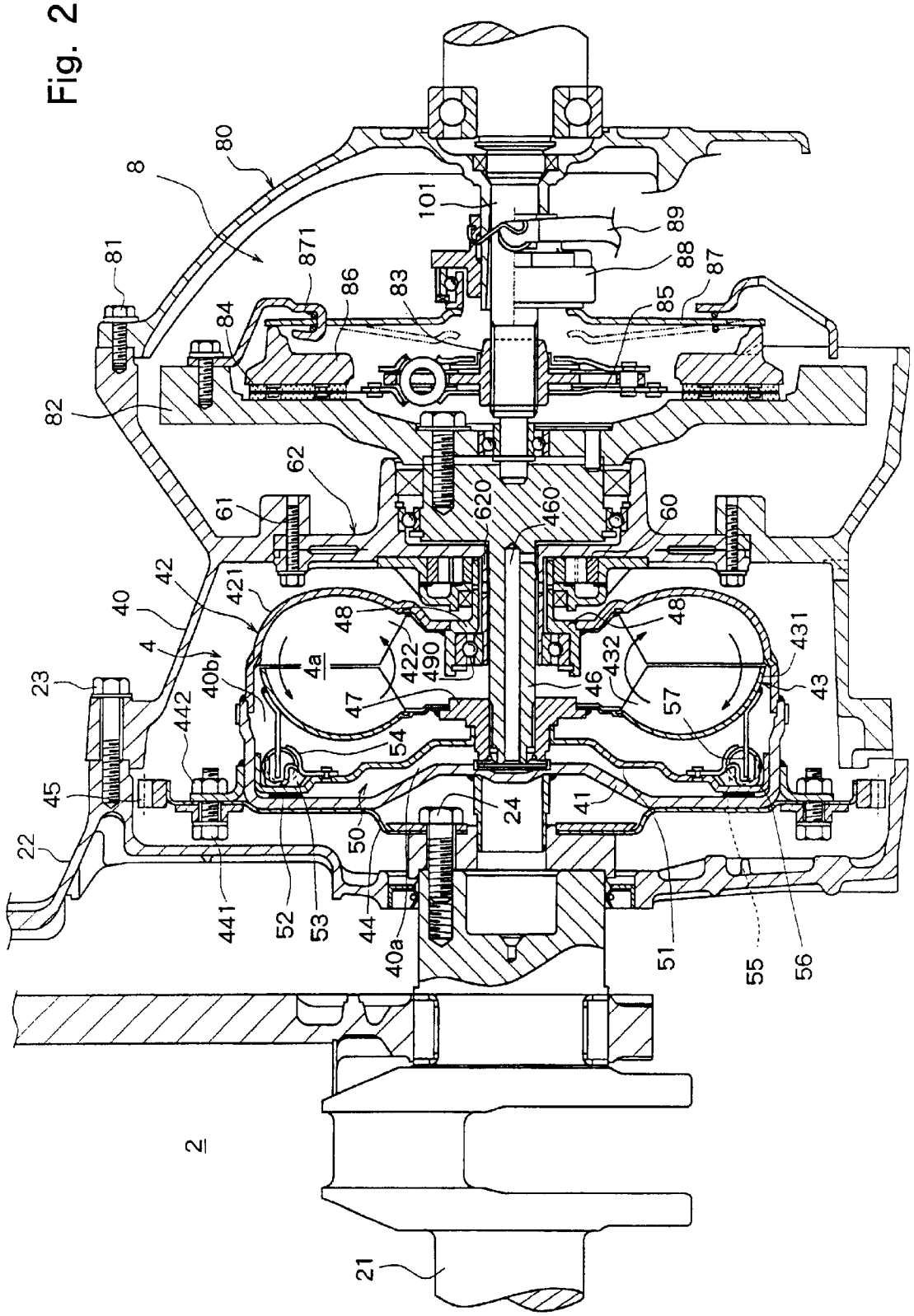
FIG. 2 is a sectional view of an essential portion showing an embodiment of a vehicle driving device applied to the invention.

Next, the fluid coupling is described with reference to FIG. 2.

The fluid coupling 4 is disposed in a fluid coupling housing 40 attached by fastening means, such as a bolt 23, to a housing 22 mounted on the diesel engine 2. The fluid coupling 4 in the illustrated embodiment includes a casing 41, a pump 42, and a turbine 43.

The casing 41 is mounted by fastening means, such as bolts 441 and nuts 442, to an outer peripheral portion of a drive plate 44 having an inner peripheral portion mounted by a bolt 24 to a crankshaft 21 of the diesel engine 2. On the outer periphery of the drive plate 44, a starting ring gear 45 meshing with a driving gear of a starter motor (not shown) is mounted.

The pump 42 is disposed opposite the casing 41. The pump 42 includes a bowl-shaped pump shell 421, and a plurality of impellers 422 disposed radially inside the pump shell 421. The pump shell 421 is attached to the casing 41 by bonding means such as welding. Thus, the pump shell 421 of the pump 42 is connected to the crankshaft 21 via the casing 41 and the drive plate 44. Therefore, the crankshaft 21 functions as an input shaft of the fluid coupling 4.

The turbine 43 is disposed opposite the pump 42 in a chamber formed by the pump 42 and the casing 41. The turbine 43 has a bowl-shaped turbine shell 431 disposed opposite the pump shell 421 of the pump 42, and a plurality of runners 432 disposed radially inside the turbine shell 431. The turbine shell 431 is attached by bonding means, such as welding, to a turbine hub 47 splined to an output shaft 46 disposed coaxially with the crankshaft 21 as the input shaft.

The fluid coupling 4 in the illustrated embodiment includes a lock-up clutch 50 for direct transmissive connection of the casing 41 and the turbine 43. The lock-up clutch 50 has a clutch disc 51, which is disposed between the casing 41 and the turbine 43 to form an outside chamber 40a together with the casing 41 and an inside chamber 40b together with the turbine 43. The clutch disc 51 has an inner peripheral edge supported relatively rotatably and axially slidably on the outer periphery of the turbine hub 47. On an outer peripheral portion of the clutch disc 51, a clutch facing 52 is mounted on a surface thereof opposed to the casing 41. In the outer peripheral portion of the clutch disc 51 positioned beside the inside chamber 40b, an annular depression 53 is formed. In the depression 53, a plurality of damper springs 55 supported by support pieces 54 are disposed at predetermined intervals. On both sides of the plurality of damper springs 55, input-side retainers 56 attached to the clutch disc 51 are disposed protrusively. Between the damper springs 55, output-side retainers 57 attached to the turbine shell 431 of the turbine 43 are disposed protrusively.

Actions of the lock-up clutch 50 constituted as described above in the illustrated embodiment will be explained.

When the pressure of a working fluid in the inside chamber 40b is higher than the pressure of the working fluid in the outside chamber 40a, namely, when the working fluid supplied by lock-up clutch actuating means (to be described later on) flows from an actuating chamber 4a, which is formed by the pump 42 and the turbine 43, to the outside chamber 40a through the inside chamber 40b, the clutch disc 51 is pushed leftward in FIG. 2. As a result, the clutch facing 52 mounted on the clutch disc 51 is pressed against the casing 41 to realize friction engagement (lock-up clutch engaged). Thus, the casing 41 and the turbine 43 come into direct transmissive connection via the clutch facing 52, clutch disc 51, input-side retainers 56, damper springs 55, and output-side retainers 57. When the pressure of the working fluid in the outside chamber 40a is higher than the pressure of the working fluid in the inside chamber 40b, namely, when the working fluid supplied by working fluid circulating means (to be described later on) circulates from the outside chamber 40a into the actuating chamber 4a, which is formed by the pump 42 and the turbine 43, through the inside chamber 40b, the clutch disc 51 is pushed rightward in FIG. 2. As a result, the clutch facing 52 mounted on the clutch disc 51 does not make friction engagement with the casing 41 (lock-up clutch disengaged). Thus, transmissive connection between the casing 41 and the turbine 43 is released.

Figure 3:
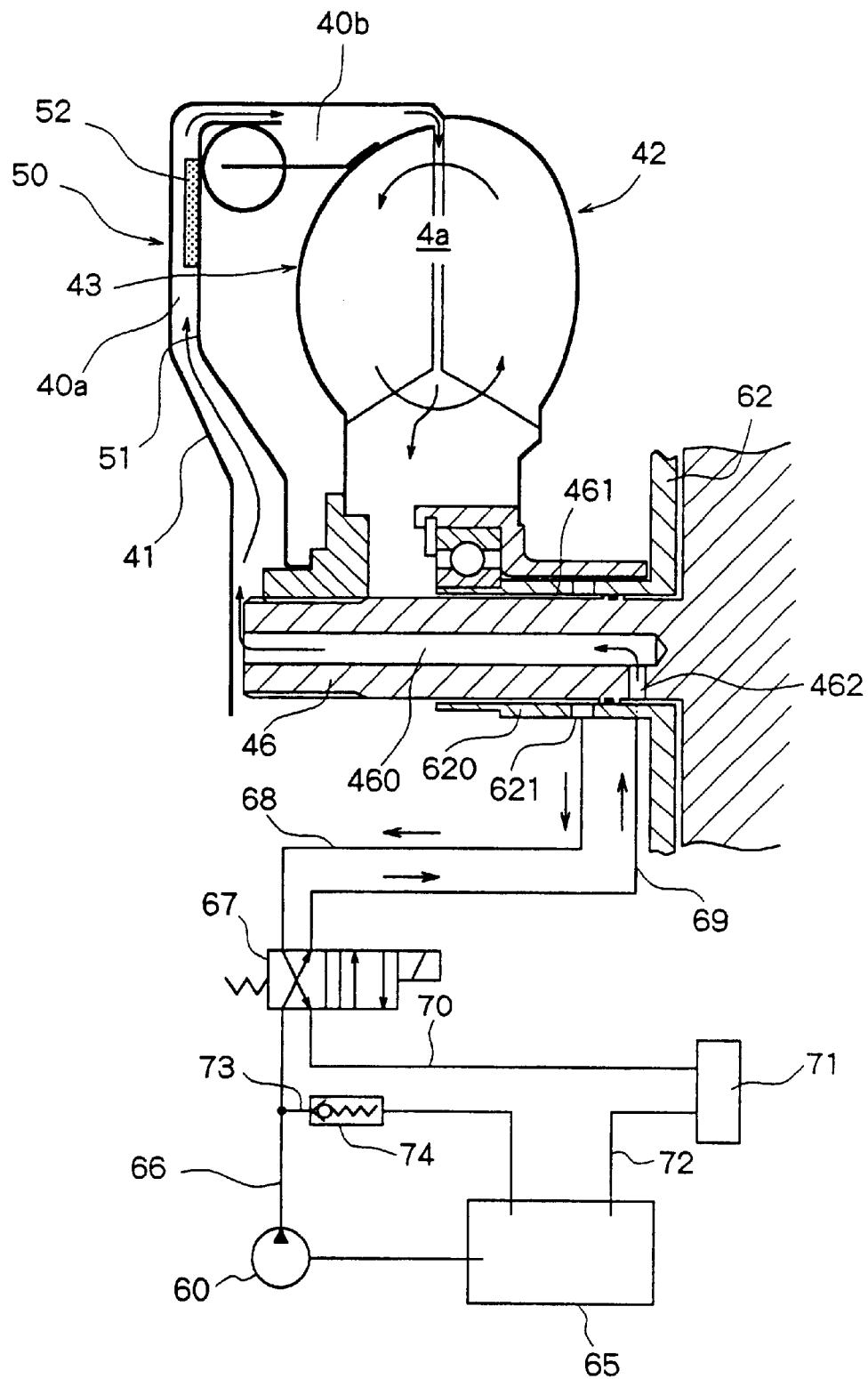
FIG. 3 is an explanatory drawing of a lock-up clutch disengaged state, showing an operating state of lock-up clutch actuating means provided in the vehicle driving device shown in FIG. 2.
Figure 4:
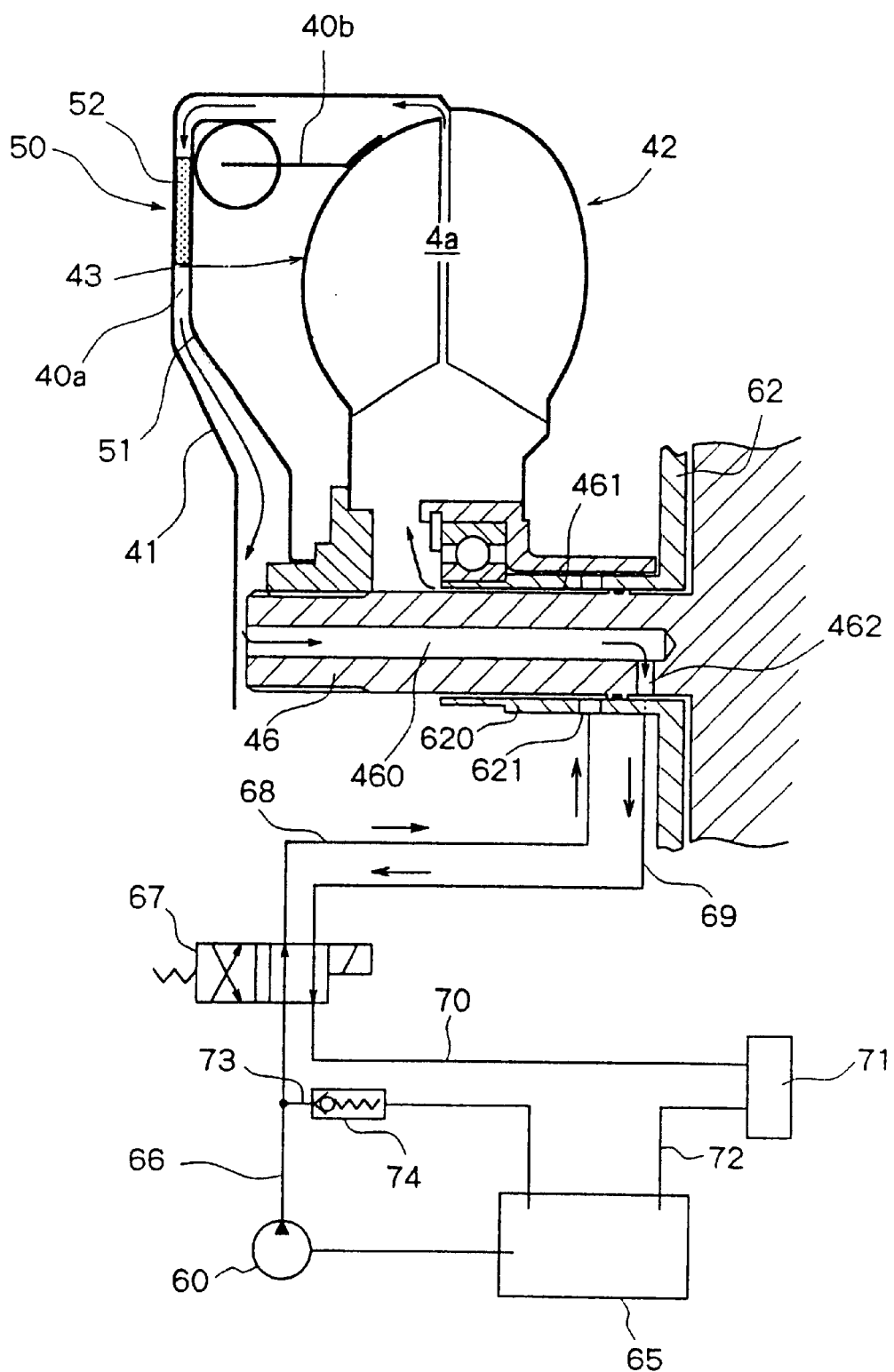
FIG. 4 is an explanatory drawing of a lock-up clutch engaged state, showing an operating state of the lock-up clutch actuating means provided in the vehicle driving device shown in FIG. 2.

The driving device in the illustrated embodiment includes a hydraulic pump 60 as a fluid pressure source of the lock-up clutch actuating means (to be described later on). The hydraulic pump 60 is disposed in a pump housing 62 attached by bonding means, such as bolts 61, to the fluid coupling housing 40. The hydraulic pump 60 is adapted to be rotationally driven by a pump hub 48 attached to the pump shell 421 of the pump 42. The pump hub 48 is supported rotatably by a bearing 490 on a tubular support portion 620 of the pump housing 62 which is formed protrusively so as to surround the output shaft 46. As shown in FIGS. 3 and 4, a passage 460 for the working fluid is provided in the output shaft 46 in conjunction with the lock-up clutch actuating means (to be described later on). Also, a passage 461 for the working fluid is provided between the output shaft 46 and the tubular support portion 620. The passage 460 has an end open at a left end face of the output shaft 46 in the drawing, and communicates with the outside chamber 40a. The other end of the passage 460 communicates with a diametrical passage 462 which opens at an outer peripheral surface of the output shaft 46. The passage 461 is configured to establish communication between the actuating chamber 4a formed by the pump 42 and the turbine 43 and a communication hole 621 provided in the tubular support portion 620.

Next, lock-up clutch actuating means for circulating the working fluid to the fluid coupling 4 will be described with reference to FIGS. 3 and 4.

The lock-up clutch actuating means includes a reserve tank 65 accommodating the working fluid. The working fluid in the reserve tank 65 is discharged into a passage 66 by the hydraulic pump 60. The working fluid discharged into the passage 66 is fed into a passage 68 communicating with the communication hole 621, or a passage 69 communicating with the passage 462 via an electromagnetic direction control valve 67 which controls a circulation path for the working fluid. The electromagnetic direction control valve 67 is controlled by controlling means (to be described later on) based on the operating state of the vehicle driving device and the running speed of the vehicle. When the electromagnetic direction control valve 67 is in a deenergized (OFF) state as shown in FIG. 3, the working fluid discharged into the passage 66 is circulated to the reserve tank 65 through the passage 69, passage 462, passage 460, outside chamber 40a, inside chamber 40b, actuating chamber 4a formed by pump 42 and turbine 43, passage 461, communication hole 621, passage 68, return passage 70, cooler 71, and passage 72, as indicated by arrows. When the working fluid is circulated as shown by the arrows in FIG. 3, the fluid pressure in the outside chamber 40a is higher than the fluid pressure in the inside chamber 40b, so that the lock-up clutch 50 is out of friction engagement (lock-up clutch disengaged), as stated earlier. When the electromagnetic direction control valve 67 is brought into an energized (ON) state as shown in FIG. 4, the working fluid discharged into the passage 66 is circulated to the reserve tank 65 through the passage 68, communication hole 621, passage 461, actuating chamber 4a formed by pump 42 and turbine 43, inside chamber 40b, outside chamber 40a, passage 460, passage 462, passage 69, return passage 70, cooler 71, and passage 72, as indicated by arrows. When the working fluid is circulated as shown by the arrows in FIG. 4, the fluid pressure in the inside chamber 40b is higher than the fluid pressure in the outside chamber 40a, so that the lock-up clutch 50 comes into friction engagement (lock-up clutch engaged).

A fluid circuit in the illustrated embodiment is provided with a relief passage 73 for connecting the passage 66 and the reserve tank 65. In the relief passage 73, a relief valve 74 is disposed. The relief valve 74 has a valve opening pressure set at, for example, 6 kg/cm², a fluid pressure necessary for the clutch facing 52 mounted on the clutch disc 51 to be pressed against the casing 41 and friction engaged therewith, when the lock-up clutch is ON. When the working fluid pressure in the passage 66 exceeds 6 kg/cm², the relief valve 74 returns the working fluid to the reserve tank 65 via the relief passage 73.

Next, the friction clutch 8 will be described referring to FIG. 2.

The friction clutch 8 is disposed in a clutch housing 80 mounted to the fluid coupling housing 40 by a bolt 81. The friction clutch 8 in the illustrated embodiment includes a clutch drive plate 82 mounted on the output shaft 46 of the fluid coupling; a clutch hub 83 splined to an input shaft 101 of the transmission 10 disposed coaxially with the output shaft 46; a clutch driven plate 85 attached to the clutch hub 83 and having a clutch facing 84 mounted on an outer peripheral portion thereof; a pressure plate 86 for pressing the clutch driven plate 85 against the clutch drive plate 82; a diaphragm spring 87 for urging the pressure plate 86 toward the clutch drive plate 82; a release bearing 88 which engages with an inner end portion of the diaphragm spring 87 to actuate the diaphragm spring 87 with an intermediate portion of the diaphragm spring 87 as a fulcrum 871; and a clutch release fork 89 for actuating the release bearing 88 in an axial direction. The clutch release fork 89 is actuated by the friction clutch actuating means 90 shown in FIG. 1.

The friction clutch actuating means 90 in the illustrated embodiment is composed of a clutch pedal 91, a clutch master cylinder 92 actuated by the clutch pedal 91 to generate an oil pressure, and a slave cylinder 94 connected to the clutch master cylinder 92 by a hydraulic pipe 93 and actuated by the oil pressure generated by the clutch master cylinder 92. A piston rod 941 of the slave cylinder 94 is in engagement with an end portion of the clutch release fork 89. In the illustrated state in which the clutch pedal 91 is not depressed, the above-described parts constituting the friction clutch 8 are positioned in the state shown in FIG. 2, and the pressure plate 86 is pushed toward the clutch drive plate 82 by the spring force of the diaphragm spring 87. Thus, the clutch facing 84 mounted on the clutch driven plate 85 is pressed against the clutch drive plate 82 and put into friction engagement therewith (friction clutch engaged). As a result, power transmitted to the output shaft 46 of the fluid coupling is transmitted to the input shaft 101 of the transmission 10 via the clutch drive plate 82 and the clutch driven plate 85. When the clutch pedal 91 is depressed to generate an oil pressure in the clutch master cylinder 92, the slave cylinder 94 is actuated to move the release bearing 88 leftward in FIG. 2 via the clutch release fork 89. Thus, the diaphragm spring 87 is actuated as indicated by two-dot chain lines in FIG. 2 to release a pushing force on the pressure plate 86. As a result, power transmission from the clutch drive plate 82 to the clutch driven plate 85 is broken (friction clutch disengaged).

The vehicle driving device in the illustrated embodiment is constituted as described above. Its actions will be explained.

First, transmission of power by the action of the working fluid via the fluid coupling 4 is described. In this case, the electromagnetic direction control valve 67 of the lock-up clutch actuating means is deenergized (OFF), and the working fluid is circulated in directions shown by the arrows in FIG. 3, as described earlier. While the working fluid is being circulated in the directions shown by the arrows in FIG. 3, as described previously, the pressure in the outside chamber 40a is higher than the pressure in the inside chamber 40b, whereby the clutch disc 51 is pushed rightward in FIGS. 2 and 3. Thus, the clutch facing 52 mounted on the clutch disc 51 does not friction engage with the casing 41 (lock-up clutch disengaged). Consequently, a driving force which has occurred in the crankshaft 21 (input shaft) of the diesel engine 2 is transmitted to the casing 41 of the fluid coupling 4 via the drive plate 44 as stated earlier. Since the casing 41 and the pump shell 421 of the pump 42 are integrally constituted, the pump 42 is rotated by the driving force. Upon rotation of the pump 42, the working fluid in the pump 42 flows toward the outer periphery along the impellers 422 under a centrifugal force, and flows into the turbine 43 as shown by arrows. The working fluid that has flowed into the turbine 43 flows toward the center, and is then returned to the pump 42 as shown by arrows. Since the working fluid inside the actuating chamber 4a formed by the pump 42 and the turbine 43 circulates between the pump 42 and the turbine 43 in this manner, driving torque of the pump 42 is transmitted to the turbine 43 via the working fluid. The driving force transmitted to the turbine 43 is transmitted to the output shaft 46 via the turbine shell 431 and the turbine hub 47, and is further transmitted to the transmission 10 via the friction clutch 8.

Next, a description will be offered of a state in which the lock-up clutch 50 is actuated to connect the casing 41 and the turbine 43 directly, thereby transmitting driving torque. In this case, the electromagnetic direction control valve 67 of the lock-up clutch actuating means is energized (ON), and the working fluid is circulated in the directions shown by the arrows in FIG. 4. While the working fluid is being circulated in the directions shown by the arrows in FIG. 4, as described previously, the pressure in the inside chamber 40b is higher than the pressure in the outside chamber 40a, whereby the clutch disc 51 is pushed leftward in FIGS. 2 and 4. Thus, the clutch facing 52 mounted on the clutch disc 51 is pressed against the casing 41 and friction engaged therewith (lock-up clutch engaged). Consequently, the casing 41, the pump 42 and the turbine 43 are put into direct transmissive connection via the clutch facing 52, clutch disc 51, input-side retainer 56, damper spring 54, and output-side retainer 57. Thus, a driving force which has occurred in the crankshaft 21 (input shaft) of the diesel engine 2 is transmitted to the output shaft 46 via the drive plate 44, casing 41, lock-up clutch 50, turbine 43, and turbine hub 47. The driving force is further transmitted to the transmission 10 via the friction clutch 8.

Next, the lock-up clutch controlling device will be described with reference to FIG. 1.

The lock-up clutch controlling device in the illustrated embodiment includes engine revolution speed detecting means 201 for detecting the revolution speed of the diesel engine 2, clutch engagement amount detecting means 202 for detecting the amount of engagement of the friction clutch 8, input shaft revolution speed detecting means 203 for detecting the revolution speed of the input shaft 101 of the transmission 10, gear position detecting means 204 for detecting the gear position of the transmission 10, and vehicle speed detecting means 205 for detecting the running speed of the vehicle. The engine revolution speed detecting means 201 comprises, for example, a pulse generator disposed opposite the ring gear 45, and sends its detection signal to controlling means (to be described later on). The clutch engagement amount detecting means 202 in the illustrated embodiment comprises a potentiometer for detecting the actuating position of the clutch release fork 89, i.e., the amount of clutch engagement, and sends its detection signal to the controlling means (to be described later on). The clutch engagement amount detecting means 202 also serves as clutch detecting means for detecting an engagement state of the friction clutch by detecting the amount of clutch engagement. The input shaft revolution speed detecting means 203 comprises a pulse generator disposed opposite the input shaft 101 of the transmission 10, and sends its detection signal to the controlling means (to be described later on). The gear position detecting means 204 comprises a group of switches for detecting the select position and shift position of a change lever 110, and sends its detection signal to the controlling means (to be described later on). The controlling means (to be described later on) determines the gear position by a combination of the switches corresponding to the signal sent. The vehicle speed detecting means 205 in the illustrated embodiment comprises a pulse generator disposed opposite the output shaft 102 of the transmission 10, and sends its detection signal to the controlling means (to be described later on).

The lock-up clutch controlling device in the illustrated embodiment includes controlling means 300. The controlling means 300 is composed of a microcomputer, comprising a central processing unit (CPU) 301 for performing computations in accordance with a control program, a read only memory (ROM) 302 storing the control program, a random access memory (RAM) 303 storing the results of computations, an input interface 304, and an output interface 305. The input interface 304 of the thus constituted controlling means 300 receives detection signals from the engine revolution speed detecting means 201, clutch engagement amount detecting means 202, input shaft revolution speed detecting means 203, gear position detecting means 204, and vehicle speed detecting means 205. The output interface 305 issues control signals to the electromagnetic direction control valve 67 of the lock-up clutch actuating means.

The lock-up clutch controlling device in the illustrated embodiment is constituted as described above. An embodiment of the operating procedure of the controlling means 300 will be described with reference to a flow chart shown in FIG. 5.

The controlling means 300 checks, at step S1, whether the friction clutch 8 is disengaged or not, on the basis of detection signals from the clutch detecting means 202. If the friction clutch 8 is found disengaged at step S1, the controlling means 300 proceeds to step S2, and checks whether or not the running speed (V) of the vehicle is 5 km/h or more, on the basis of detection signals from the vehicle speed detecting means 205. If the running speed (V) of the vehicle is found less than 5 km/h at step S2, the controlling means 300 judges that the disengagement of the friction clutch 8 found at step S1 is a clutch operation at start of the vehicle. The controlling means goes to step S3, executing control for disengaging the lock-up clutch 50, and returns to step S1. Concretely, control for disengagement of the lock-up clutch 50 is performed by bringing the electromagnetic direction control valve 67 of the lock-up clutch actuating means to a deenergized (OFF) state. If the running speed (V) of the vehicle is found 5 km/h or more at step S2, the controlling means 300 judges that the disengagement of the friction clutch 8 found at step S1 is a clutch operation at the time of a gear change operation. The controlling means goes to step S4, executing control for engaging the lock-up clutch 50. Concretely, the controlling means 300 brings the electromagnetic direction control valve 67 of the lock-up clutch actuating means to an energized (ON) state. As noted above, when the friction clutch 8 is disengaged and the running speed (V) of the vehicle is 5 km/h or more, a judgment is made that a gear change operation is being performed. In the illustrated embodiment, therefore, the clutch detecting means 202 and the vehicle speed detecting means 205 function as gear change operation detecting means for detecting a gear change operation of the transmission 10.

In the foregoing illustrated embodiment, the lock-up clutch 50 is controlled to be engaged, at the time of a gear change operation of the transmission 10, thereby directly connecting the casing 41 and the turbine 43. Hence, occurrence of the aforementioned clutch shock during a gear change operation of a vehicle driving device provided with a fluid coupling can be prevented. The reasons why the clutch shock can be prevented will be explained referring to FIG. 6.

Figure 6:
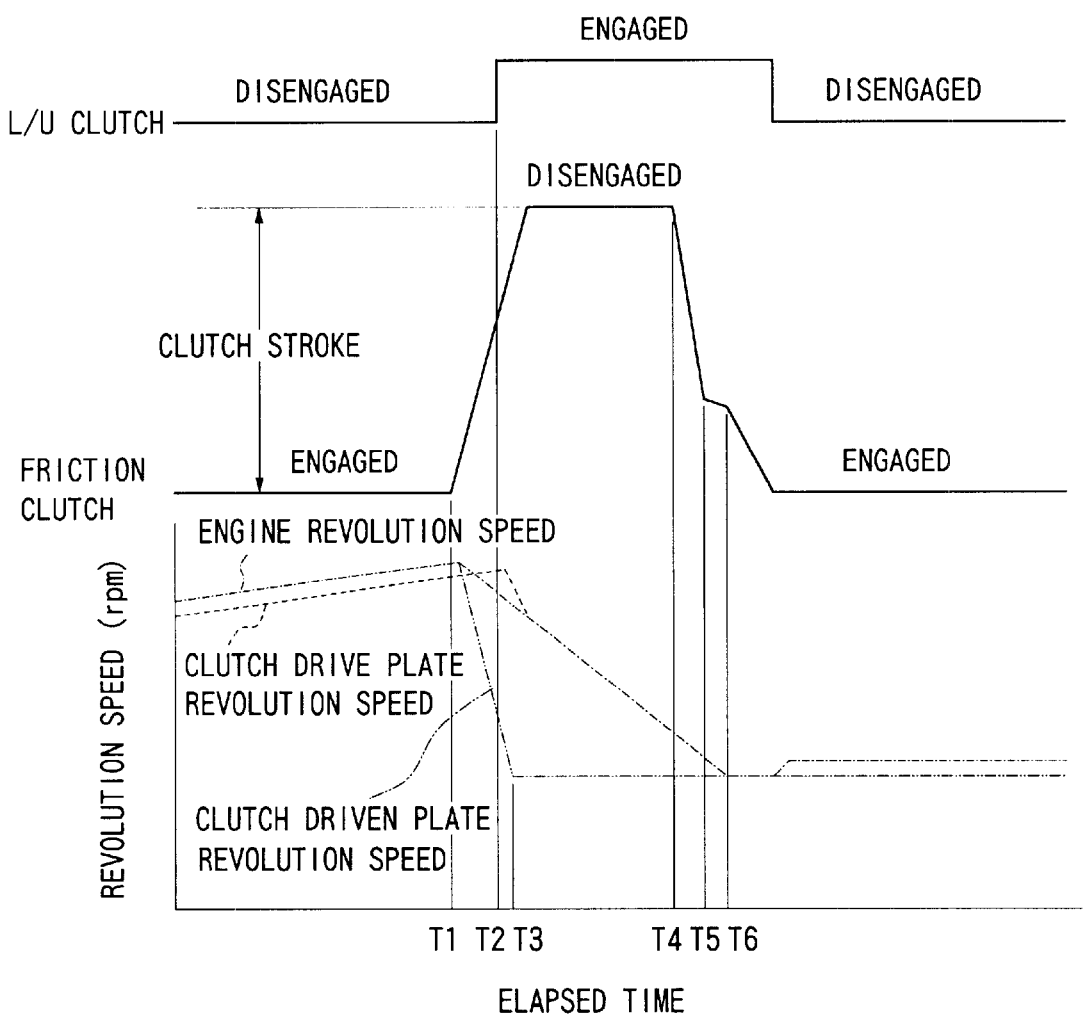
FIG. 6 is a view showing a clutch stroke, an engine revolution speed, a revolution speed of a clutch drive plate, and a revolution speed of a clutch driven plate when a lock-up clutch is engaged during a gear change operation in accordance with the flow chart shown in FIG. 5.

FIG. 6 shows an example of gear change for upshift, in which the horizontal axis shows an elapsed time during gear change. In FIG. 6, an upper solid line represents the disengaged and engaged states of the lock-up clutch (L/U clutch) 50, a lower solid line represents the clutch stroke of the friction clutch 8, a one-dot chain line represents the revolution speed of the engine 2, a dashed line represents the revolution speed of the clutch drive plate 82 of the friction clutch 8, and a two-dot chain line represents the revolution speed of the clutch driven plate 85 of the friction clutch 8. In FIG. 6, a gear change operation is started at a time point T1 while a vehicle is running. First of all, a driver begins to disengage the friction clutch 8 at the time point T1, and nearly simultaneously releases an accelerator pedal. As a result, the engine revolution speed decreases as indicated by the one-dot chain line. When the driver upshifts the transmission 10 while the engine revolution speed is lowering, the revolution speed of the clutch driven plate 85 indicated by the two-dot chain line is lowered to a revolution speed corresponding to the running speed of the vehicle not later than a time point T3 by the action of a synchromesh provided in the transmission 10, since the friction clutch 8 is disengaged. At a time point T2 when the friction clutch has reached a clutch stroke position where the friction clutch becomes substantially disengaged during the disengagement operation of the friction clutch 8, the L/U clutch 50 is engaged as stated earlier. Upon engagement of the L/U clutch 50, the casing 41, pump 42 and turbine 43 of the fluid coupling 4 are directly connected and integrated. Thus, the revolution speed of the clutch drive plate 82 immediately agrees with the engine revolution speed, as indicated by the dashed line. When the operation for shifting up the transmission is completed, the driver starts engaging the friction clutch 8 at a time point T4. At a time point T5, the friction clutch 8 comes into a state of partial engagement. At a time point T6, a judgment is made that the revolution speed of the clutch driven plate 85 and the engage revolution speed have agreed. Thus, the friction clutch 8 is rapidly engaged. At this time, the revolution speed of the clutch driven plate 85 is in agreement with the engage revolution speed as mentioned above. Thus, the clutch drive plate 82 and the clutch driven plate 85 agree in terms of the revolution speed, and there is no difference in revolution speed between them. Therefore, rapid engagement does not result in shock. That is, the revolution speeds of the engine and the clutch drive plate 82 agree because of the L/U clutch 50 being engaged during gear change operation. Hence, agreement of revolution can be performed in the same manner as in an ordinary driving device without a fluid coupling. The L/U clutch 50 engaged during the gear change operation is disengaged, if the friction clutch 8 is engaged and the gear position of the transmission 10 is, for example, the second or first gear, or the running speed (V) of the vehicle is, for example, less than 30 km/h, or the engine revolution speed (R) is, for example, less than 1,000 rpm.

The flow chart shown in FIG. 5 will be referred to again for continued explanation.

If the friction clutch 8 is found not disengaged at step S1, namely, the friction clutch 8 is in an engaged state, the controlling means 300 proceeds to step S5, checking whether the L/U clutch 50 is engaged or not. This checking is done, in the illustrated embodiment, by determining whether the electromagnetic direction control valve 67 is energized (ON) or not. If the L/U clutch 50 is found engaged at step S5, the controlling means 300 proceeds to step S6, checking whether or not the gear position of the transmission 10 is, for example, the third or higher gear. If the gear position of the transmission 10 is found not the third or higher gear at step S6, i.e., if it is found to be the second or lower gear, the controlling means 300 goes to step S3, disengaging the L/U clutch 50. The reason behind this is as follows: In the case of a truck, for example, the second gear is often set as the start gear, and has a great driving force. If the L/U clutch 50 is in a directly engaged state, a shift shock occurs. To prevent the occurrence of the shift shock, the L/U clutch 50 is disengaged.

If the gear position of the transmission 10 is found to be, for example, the third or higher gear at step S6, the controlling means 300 goes to step S7, checking whether or not the running speed (V) of the vehicle is, for example, 30 km/h or more. If the running speed (V) is found at step S7 not to be 30 km/h or more, i.e., if it is found to be less than 30 km/h, the controlling means 300 goes to step S3, disengaging the L/U clutch 50. The reason is as follows: If the L/U clutch 50 is in a directly engaged state during a low speed run, torque fluctuations appear markedly responsive to moves of the accelerator pedal, causing a jerky ride. To accommodate these fluctuations by the fluid coupling 4, the L/U clutch 50 is disengaged.

If the running speed (V) of the vehicle is found at step S7 to be, for example, 30 km/h or more, the controlling means 300 proceeds to step S8, checking whether or not the engine revolution speed is, for example, 1,000 rpm or more. If the engine revolution speed (R) is found at step S8 not to be, for example, 1,000 rpm or more, i.e., if it is less than 1,000 rpm, the controlling means 300 goes to step S3, disengaging the L/U clutch 50. The reason is as follows: If the L/U clutch 50 is directly engaged while the engine is working with low speed rotation, the engine may stall. To prevent this situation, the L/U clutch 50 is disengaged.

If the L/U clutch 50 is found not engaged at step S5, namely, the L/U clutch 50 is in a disengaged state, the controlling means 300 proceeds to step S9, checking whether or not the gear position of the transmission 10 is, for example, the third or higher gear. If the gear position of the transmission 10 is found not the third or higher gear at step S9, direct engagement of the L/U clutch 50 may cause a shift shock, as stated earlier. To prevent the shift shock, the L/U clutch 50 is kept disengaged, and step S1 is resumed.

If the gear position is found at step S9 to be the third or higher gear, the controlling means 300 proceeds to step S10, checking whether or not the difference in revolution speed between the pump 42 (P) and the turbine 43 (T) is 200 rpm or less (P−T≦200 rpm). If, at step S10, the difference in revolution speed between the pump 42 (P) and the turbine 43 (T) is found not to be 200 rpm or less, i.e., if the difference in revolution speed is greater than 200 rpm, direct engagement of the L/U clutch 50 would cause a great shock. Thus, the L/U clutch 50 is kept disengaged, and step S1 is resumed.

If, at step S10, the difference in revolution speed between the pump 42 (P) and the turbine 43 (T) is found to be 200 rpm or less, the controlling means 300 proceeds to step S11, checking whether or not the running speed (V) of the vehicle is, for example, 30 km/h or more. If the running speed (V) is found at step S11 not to be 30 km/h or more, i.e., if it is found to be less than 30 km/h, direct engagement of the L/U clutch 50 would cause a jerky ride, as stated earlier. Thus, the L/U clutch 50 is kept disengaged, and step S1 is resumed.

If the running speed (V) is found at step S11 to be 30 km/h or more, the controlling means 300 proceeds to step S12, checking whether or not the engine revolution speed (R) is, for example, 1,000 rpm or more. If the engine revolution speed (R) is found at step S12 not to be 1,000 rpm or more, i.e., if it is less than 1,000 rpm, direct engagement of the L/U clutch 50 may cause an engine stall. Thus, the L/U clutch 50 is kept disengaged, and step S1 is resumed. If the engine revolution speed (R) is found at step S12 to be 1,000 rpm or more, the controlling means 300 proceeds to step S4, engaging the L/U clutch 50, and returns to step S1.

Figure 5:
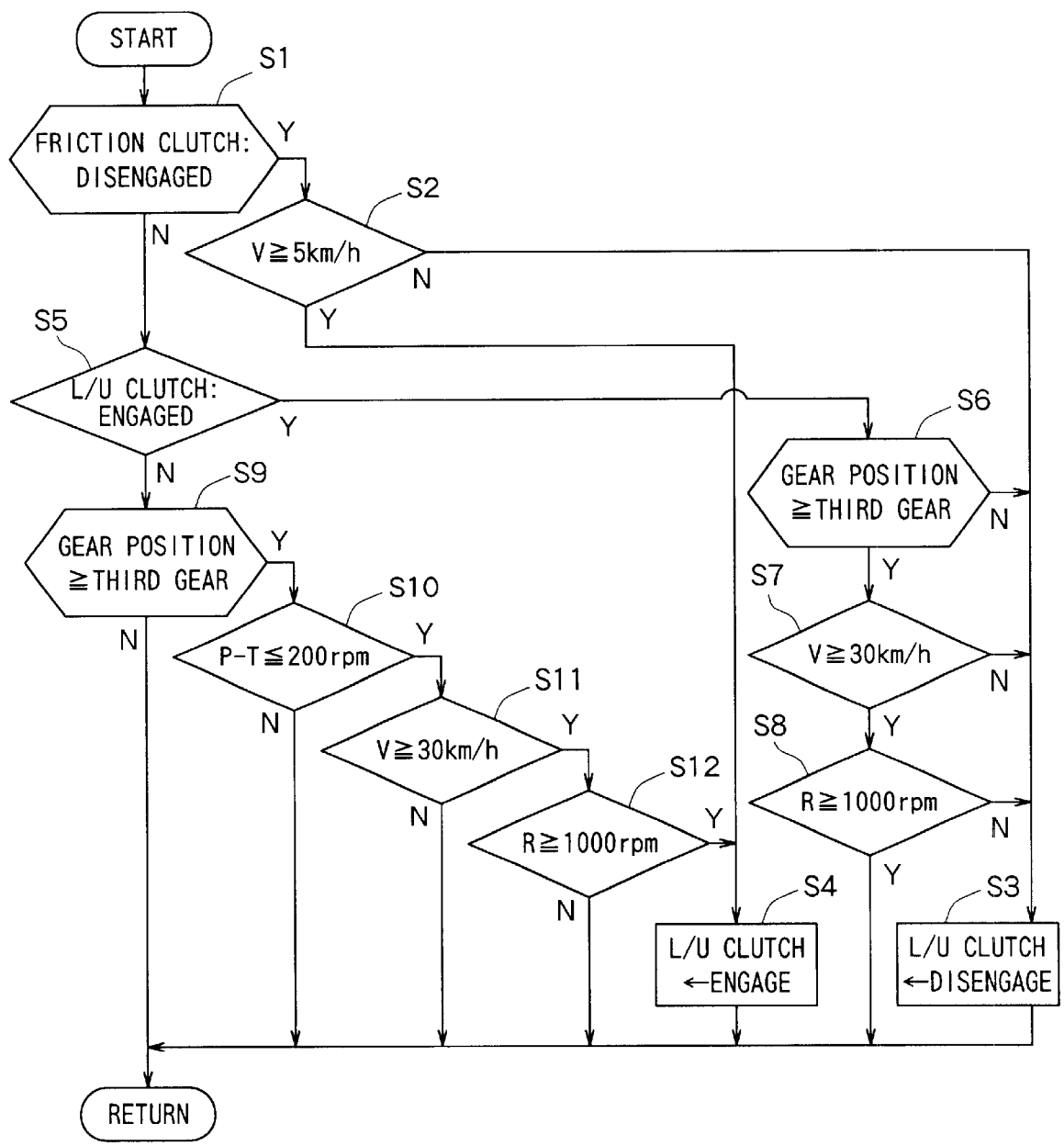
FIG. 5 is a flow chart showing an embodiment of actions of controlling means provided in the lock-up clutch controlling device of the vehicle driving device shown in FIG. 1.

According to the foregoing embodiment shown in FIGS. 5 and 6, the vehicle driving device having the fluid coupling equipped with the lock-up clutch is designed such that the lock-up clutch is engaged during gear change operation. Thus, agreement of revolution between the clutch drive plate and the clutch driven plate of the friction clutch can be performed in the same manner as in an ordinary driving device without a fluid coupling. Hence, clutch shock due to the difference in revolution speed between the clutch drive plate and the clutch driven plate can be prevented. Furthermore, it becomes easy to engage the friction clutch, with revolutions of the clutch drive plate and the clutch driven plate being brought into agreement. Accordingly, the clutch facing wears minimally, and its durability increases.

Next, another embodiment of the operating procedure of the controlling means 300 will be described with reference to a flow chart shown in FIG. 7.

The controlling means 300 checks, at step P1, whether or not the friction clutch 8 is disengaged, on the basis of detection signals from the clutch engagement amount detecting means 202. If the friction clutch 8 is found disengaged at step P1, the controlling means 300 proceeds to step P2, and checks whether or not the running speed (V) of the vehicle is 5 km/h or more, on the basis of detection signals from the vehicle speed detecting means 205. If the running speed (V) of the vehicle is found less than 5 km/h at step P2, the controlling means 300 judges that the disengagement of the friction clutch 8 found at step P1 is a clutch operation at start of the vehicle. The controlling means goes to step P3, executing control for disengaging the lock-up clutch 50, and returns to step P1. Concretely, control for disengagement of the lock-up clutch 50 is performed by bringing the electromagnetic direction control valve 67 of the lock-up clutch actuating means to a deenergized (OFF) state.

If the running speed (V) of the vehicle is found 5 km/h or more at step P2, the controlling means 300 judges that the disengagement of the friction clutch 8 found at step P1 is a clutch operation at the time of a gear change operation. The controlling means goes to step P4, executing control for engaging the lock-up clutch 50. Concretely, the controlling means 300 brings the electromagnetic direction control valve 67 of the lock-up clutch actuating means to an energized (ON) state. As noted above, when the friction clutch 8 is disengaged and the running speed (V) of the vehicle is 5 km/h or more, a judgment is made that a gear change operation is being performed. In the illustrated embodiment, therefore, the clutch engagement amount detecting means 202 and the vehicle speed detecting means 205 function as gear change operation detecting means for detecting a gear change operation of the transmission 10. After control for engagement of the lock-up clutch 50 is performed at step P4, the controlling means 300 proceeds to step P5, reading detection signals from the clutch engagement amount detecting means 202, and checking whether or not the clutch engagement amount (CLT) of the friction clutch 8 has reached a predetermined amount (LI) immediately before partial clutch engagement. If the clutch engagement amount (CLT) is less than the predetermined amount (LI), the lock-up clutch 50 is kept engaged. If the clutch engagement amount (CLT) has reached the predetermined amount (LI), the controlling means 300 proceeds to step P3, executing control for disengaging the lock-up clutch 50.

In the foregoing illustrated embodiment, the lock-up clutch 50 is controlled to be engaged, at the time of a gear change operation of the transmission 10, thereby directly connecting the casing 41 and the turbine 43. Moreover, if the clutch engagement amount (CLT) of the friction clutch 8 has reached the predetermined amount (LI) immediately before partial clutch engagement, the lock-up clutch 50 is disengaged. Hence, occurrence of the aforementioned clutch shock during a gear change operation of a vehicle driving device provided with a fluid coupling can be prevented reliably. The reasons why the clutch shock can be prevented will be explained referring to FIG. 8.

Figure 8:
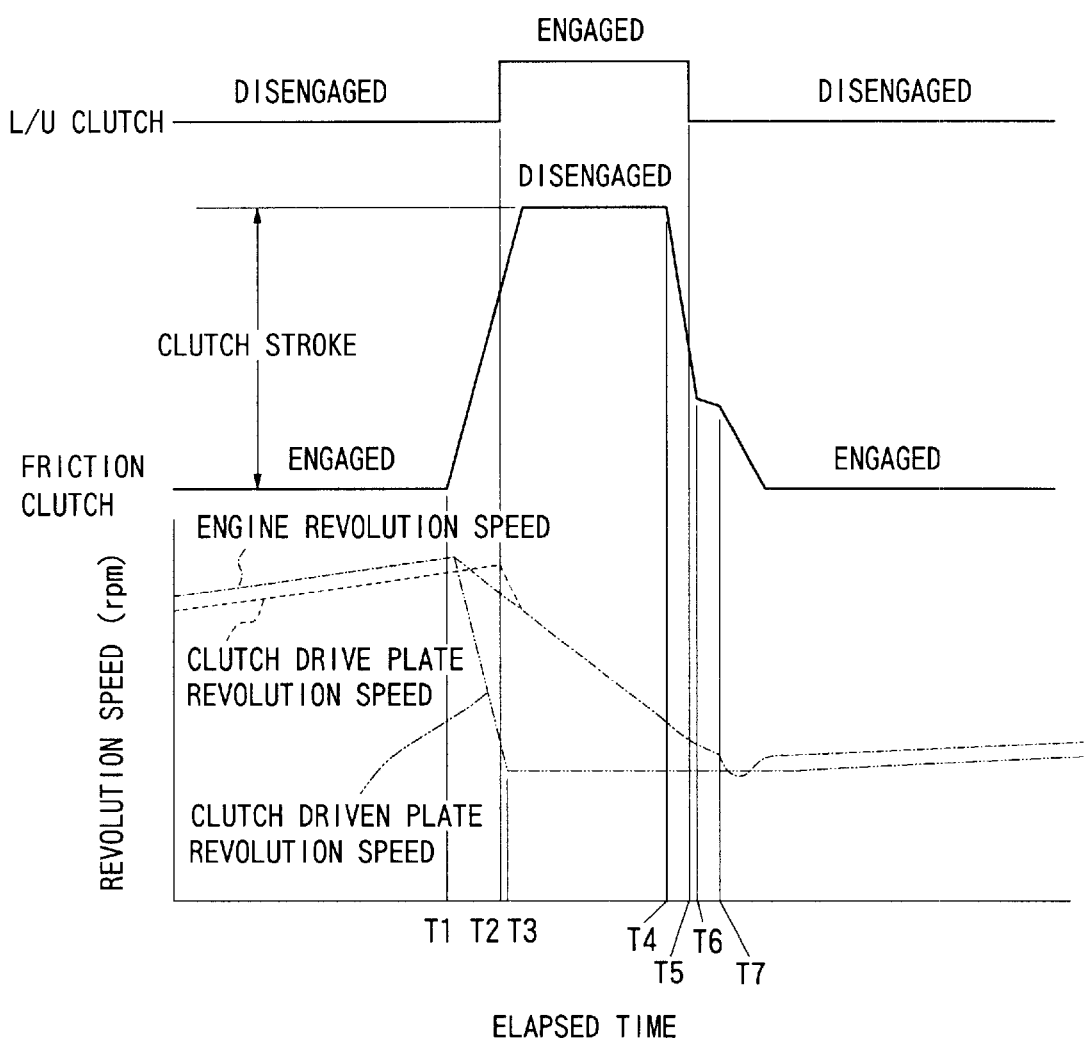
FIG. 8 is a view showing a clutch stroke, an engine revolution speed, a revolution speed of the clutch drive plate, and a revolution speed of the clutch driven plate when the lock-up clutch is engaged during a gear change operation in accordance with the flow chart shown in FIG. 7.
Figure 9:
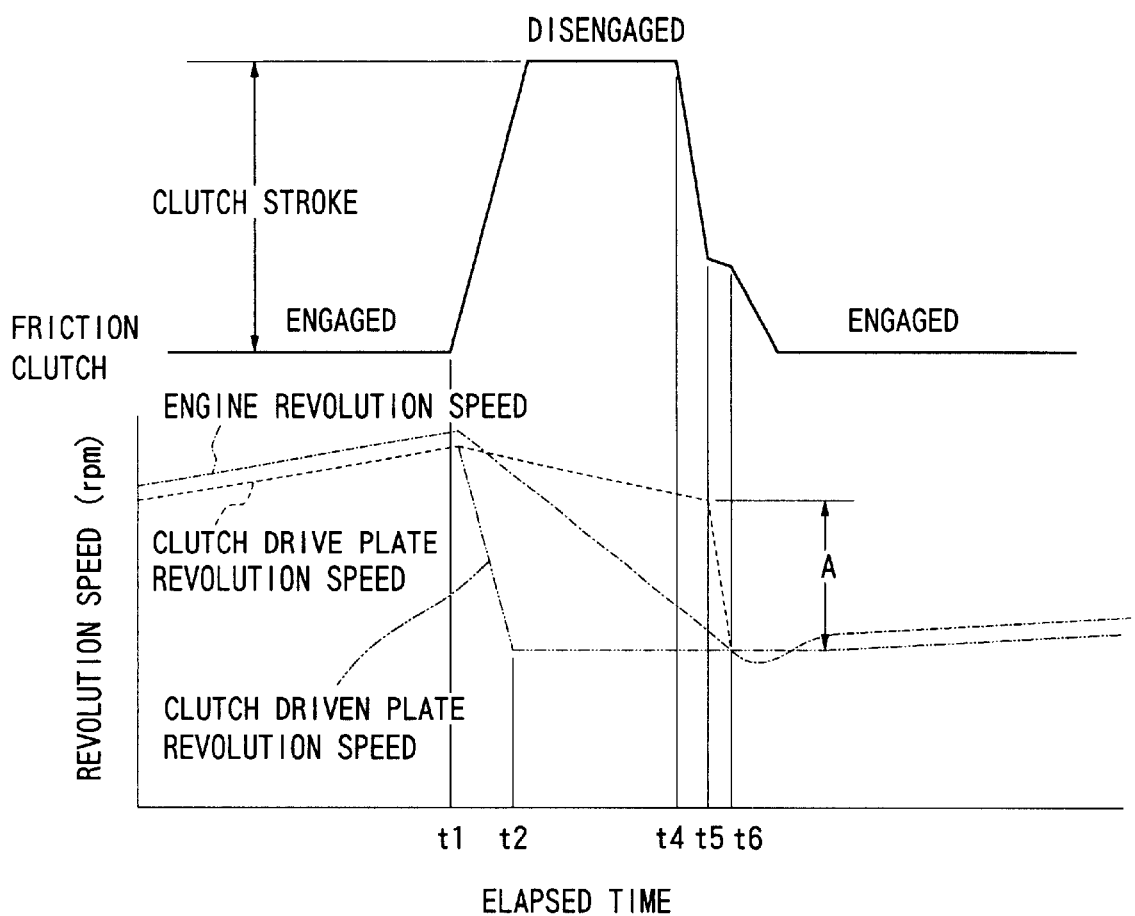
FIG. 9 is a view showing a clutch stroke, an engine revolution speed, a revolution speed of the clutch drive plate, and a revolution speed of the clutch driven plate during a gear change operation in a driving device equipped with a conventional fluid coupling.

FIG. 8 shows an example of gear change for upshift, in which the horizontal axis shows an elapsed time during gear change. In FIG. 8, an upper solid line represents the disengaged and engaged states of the lock-up clutch (L/U clutch) 50; a lower solid line represents the clutch stroke of the friction clutch 8, i.e., a clutch engagement amount; a one-dot chain line represents the revolution speed of the engine 2; a dashed line represents the revolution speed of the clutch drive plate 82 of the friction clutch 8; and a two-dot chain line represents the revolution speed of the clutch driven plate 85 of the friction clutch 8. In FIG. 8, a gear change operation is started at a time point T1 while a vehicle is running. First of all, a driver begins to disengage the friction clutch 8 at the time point T1, and nearly simultaneously releases an accelerator pedal. As a result, the engine revolution speed decreases as indicated by the one-dot chain line. When the driver upshifts the transmission 10 while the engine revolution speed is lowering in the above manner, the revolution speed of the clutch driven plate 85 indicated by the two-dot chain line is lowered to a revolution speed corresponding to the running speed of the vehicle not later than a time point T3 by the action of a synchromesh provided in the transmission 10, since the friction clutch 8 is disengaged.

At a time point T2 when the friction clutch 8 has reached a clutch stroke position where the friction clutch 8 becomes substantially disengaged during the disengagement operation of the friction clutch 8, the L/U clutch 50 is engaged as stated earlier. Upon engagement of the L/U clutch 50, the casing 41, pump 42 and turbine 43 of the fluid coupling 4 are directly connected and integrated. Thus, the revolution speed of the clutch drive plate 82 immediately agrees with the engine revolution speed, as indicated by the dashed line. When the operation for shifting up the transmission is completed, the driver starts engaging the friction clutch 8 at a time point T4. At a time point T6, the friction clutch 8 comes into a state of partial engagement. At a time point T7, a judgment is made that the revolution speed of the clutch driven plate 85 and the engage revolution speed have agreed.

Thus, the friction clutch 8 is rapidly engaged. At this time, the revolution speed of the clutch drive plate 82 is in agreement with the engage revolution speed as mentioned above. Thus, the clutch drive plate 82 and the clutch driven plate 85 nearly agree in terms of the revolution speed, and the difference in revolution speed between them is small. Therefore, rapid engagement does not result in shock. Furthermore, in the illustrated embodiment as stated above, if the clutch engagement amount (CLT) of the friction clutch 8 has reached the predetermined amount (LI) immediately before partial clutch engagement (time point T5), the lock-up clutch 50 is disengaged. Thus, even if a difference in revolution speed exists between the clutch drive plate 82 and the clutch driven plate 85, shock due to the revolution speed difference is absorbed by the working fluid of the fluid coupling 4. Hence, the occurrence of clutch shock during engagement of the friction clutch can be prevented reliably. That is, the revolution speeds of the engine and the clutch drive plate 82 agree because of the L/U clutch 50 being engaged during gear change operation. Accordingly, agreement of revolution can be performed in the same manner as in an ordinary driving device without a fluid coupling. Besides, the L/U clutch 50 is disengaged during engagement of the friction clutch, so that shock due to the revolution speed difference can be absorbed by the working fluid of the fluid coupling.

Next, a description will be presented of another embodiment for detecting at step P5 a state in which the clutch engagement amount (CLT) of the friction clutch 8 has reached the predetermined amount (LI) immediately before partial clutch engagement.

As stated previously, the L/U clutch 50 is engaged during gear change operation, so that the engine revolution speed and the revolution speed of the clutch drive plate 82 are identical. The clutch driven plate 85, on the other hand, is splined by the clutch hub 83 to the input shaft 101 of the transmission 10. Thus, the revolution speeds of the clutch driven plate 85 and the input shaft 101 are the same. Hence, the revolution speed of the clutch drive plate 82 can be found based on signals from the engine revolution speed detecting means 201, and the revolution speed of the clutch driven plate 85 can be found based on signals from the input shaft revolution speed detecting means 203. Hence, if the difference between the engine revolution speed (i.e., the revolution speed of the clutch drive plate 82) and the revolution speed of the input shaft 101 of the transmission 10 (i.e., the revolution speed of the clutch driven plate 85) has reached a predetermined value (e.g. 200 rpm) or less, it can be judged that the clutch engagement amount (CLT) of the friction clutch 8 has reached the predetermined amount (LI) immediately before partial clutch engagement. In this manner, if the difference between the engine revolution speed and the revolution speed of the input shaft 101 of the transmission 10 has reached a predetermined value or less, the L/U clutch 50 is disengaged. Because of this measure, shock due to the revolution speed difference during engagement of the friction clutch can be absorbed by the working fluid of the fluid coupling.

The flow chart shown in FIG. 7 will be referred to again for continued explanation.

If the friction clutch 8 is found not disengaged at step P1, namely, the friction clutch 8 is in an engaged state, the controlling means 300 proceeds to step P6, checking whether the L/U clutch 50 is engaged or not. This checking is done, in the illustrated embodiment, by determining whether the electromagnetic direction control valve 67 is energized (ON) or not. If the L/U clutch 50 is found engaged at step P6, the controlling means 300 proceeds to step P7, checking whether or not the gear position of the transmission 10 is, for example, the third or higher gear. If the gear position of the transmission 10 is found not the third or higher gear at step P7, i.e., if it is found to be the second or lower gear, the controlling means 300 goes to step P3, disengaging the L/U clutch 50. The reason behind this is as follows: In the case of a truck, for example, the second gear is often set as the start gear, and has a great driving force. If the L/U clutch 50 is in a directly engaged state, a shift shock occurs. To prevent the occurrence of the shift shock, the L/U clutch 50 is disengaged.

If the gear position of the transmission 10 is found at step P7 to be, for example, the third or higher gear, the controlling means 300 goes to step P8, checking whether or not the running speed (V) of the vehicle is, for example, 30 km/h or more. If the running speed (V) is found at step P8 not to be 30 km/h or more, i.e., if it is found to be less than 30 km/h, the controlling means 300 goes to step P3, disengaging the L/U clutch 50. The reason is as follows: If the L/U clutch 50 is in a directly engaged state during a low speed run, torque fluctuations appear markedly responsive to moves of the accelerator pedal, causing a jerky ride. To accommodate these fluctuations by the fluid coupling 4, the L/U clutch 50 is disengaged.

If the running speed (V) of the vehicle is found at step P8 to be, for example, 30 km/h or more, the controlling means 300 proceeds to step P9, checking whether or not the engine revolution speed is, for example, 1,000 rpm or more. If the engine revolution speed (R) is found at step P9 not to be, for example, 1,000 rpm or more, i.e., if it is less than 1,000 rpm, the controlling means 300 goes to step P3, disengaging the L/U clutch 50. The reason is as follows: If the L/U clutch 50 is directly engaged while the engine is working with low speed rotation, the engine may stall. To prevent this situation, the L/U clutch 50 is disengaged.

If the L/U clutch 50 is found not engaged at step P6, namely, the L/U clutch 50 is in a disengaged state, the controlling means 300 proceeds to step P10, checking whether or not the gear position of the transmission 10 is, for example, the third or higher gear. If the gear position of the transmission 10 is found not the third or higher gear at step P10, direct engagement of the L/U clutch 50 may cause a shift shock, as stated earlier. To prevent the shift shock, the L/U clutch 50 is kept disengaged, and step S1 is resumed.

If the gear position is found at step P10 to be the third or higher gear, the controlling means 300 proceeds to step P11, checking whether or not the difference in revolution speed between the pump 42 (P) and the turbine 43 (T) is 200 rpm or less (P–T≦200 rpm). If, at step P11, the difference in revolution speed between the pump 42 (P) and the turbine 43 (T) is found not to be 200 rpm or less, i.e., if the difference in revolution speed is greater than 200 rpm, direct engagement of the L/U clutch 50 would cause a great shock. Thus, the L/U clutch 50 is kept disengaged, and step S1 is resumed.

If, at step P11, the difference in revolution speed between the pump 42 (P) and the turbine 43 (T) is found to be 200 rpm or less, the controlling means 300 proceeds to step P12, checking whether or not the running speed (V) of the vehicle is, for example, 30 km/h or more. If the running speed (V) is found at step P12 not to be 30 km/h or more, i.e., if it is found to be less than 30 km/h, direct engagement of the L/U clutch 50 would cause a jerky ride, as stated earlier. Thus, the L/U clutch 50 is kept disengaged, and step S1 is resumed.

If the running speed (V) is found at step P12 to be 30 km/h or more, the controlling means 300 proceeds to step P13, checking whether or not the engine revolution speed (R) is, for example, 1,000 rpm or more. If the engine revolution speed (R) is found at step P13 not to be 1,000 rpm or more, i.e., if it is less than 1,000 rpm, direct engagement of the L/U clutch 50 may cause an engine stall. Thus, the L/U clutch 50 is kept disengaged, and step S1 is resumed. If the engine revolution speed (R) is found at step P13 to be 1,000 rpm or more, the controlling means 300 proceeds to step P14, engaging the L/U clutch 50, and returns to step P1.

Figure 7:
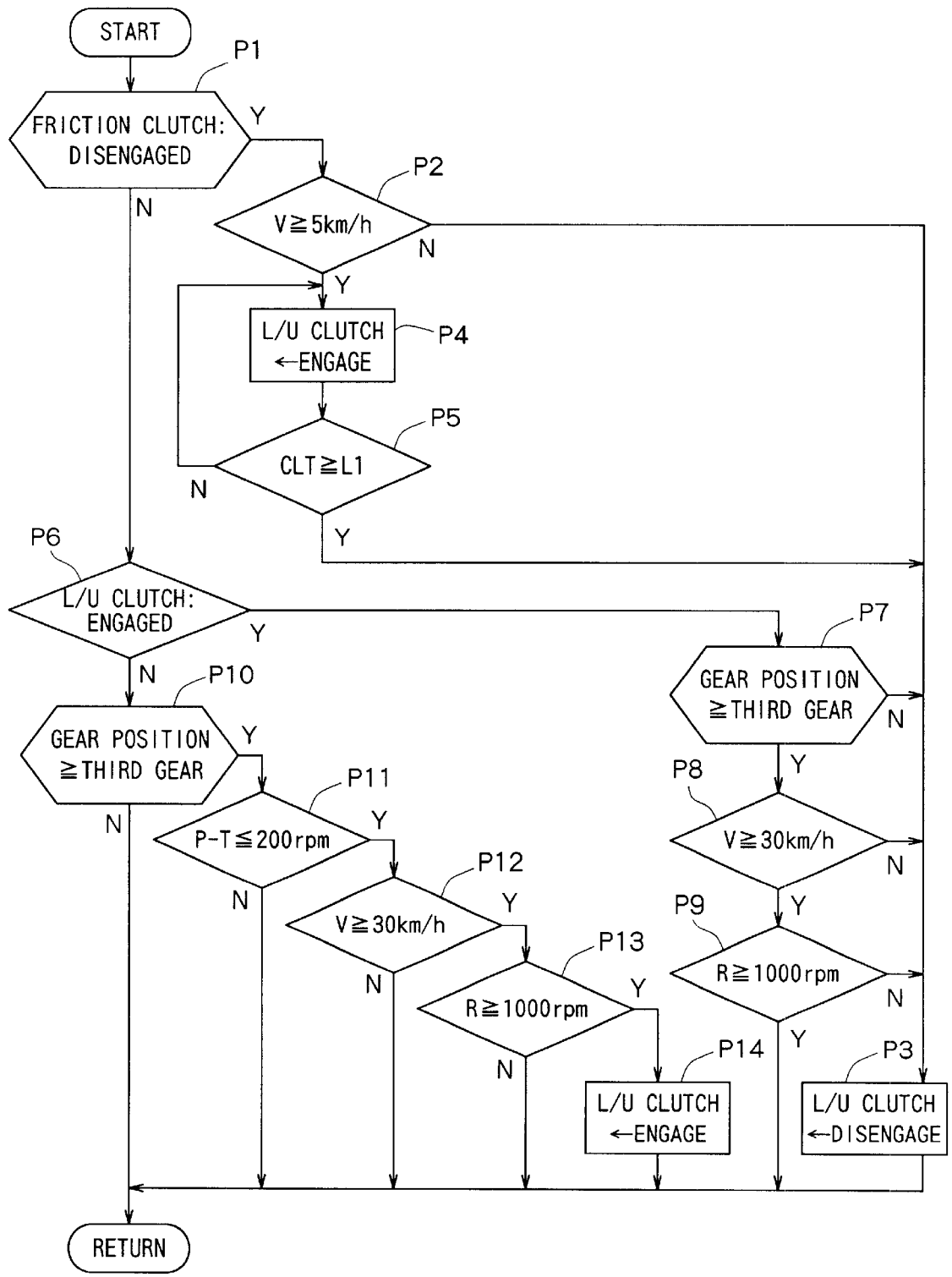
FIG. 7 is a flow chart showing another embodiment of the actions of the controlling means provided in the lock-up clutch controlling device of the vehicle driving device shown in FIG. 1.

According to the foregoing embodiment shown in FIGS. 7 and 8, the vehicle driving device having the fluid coupling equipped with the lock-up clutch is designed such that the lock-up clutch is engaged during gear change operation. Thus, agreement of revolution between the clutch drive plate and the clutch driven plate of the friction clutch can be performed in the same manner as in an ordinary driving device without a fluid coupling. Hence, clutch shock due to the difference in revolution speed between the clutch drive plate and the clutch driven plate can be prevented. Furthermore, according to the present invention, if the clutch engagement amount of the friction clutch has reached a predetermined amount immediately before partial clutch engagement, the lock-up clutch is disengaged. Thus, even if a difference in revolution speed exists between the clutch drive plate and the clutch driven plate, shock due to the revolution speed difference can be absorbed by the working fluid of the fluid coupling. Hence, the occurrence of clutch shock during engagement of the friction clutch can be prevented reliably.

The present invention has been described above based on the illustrated embodiments. However, the invention is not restricted to these embodiments, but various changes and modifications may be made within the scope of the technical ideas of the invention. For example, the illustrated embodiments have shown examples in which the gear change operation detecting means for detecting a gear change operation of the transmission comprises either the clutch detecting means for detecting disengagement and engagement of the friction clutch, or the clutch engagement amount detecting means for detecting the amount of engagement of the friction clutch, and the vehicle speed detecting means for detecting the running speed of the vehicle. However, in a vehicle equipped with an automatic clutch, for example, signals from a gear change instruction switch provided on a change lever may be used.

What we claim is:

1. A lock-up clutch controlling device of a vehicle driving device, the vehicle driving device including an engine installed in a vehicle, a fluid coupling actuated by the engine, and a friction clutch disposed between the fluid coupling and a transmission, the fluid coupling having a lock-up clutch, the lock-up clutch controlling device comprising:

lock-up clutch actuating means for actuating the lock-up clutch;

gear change operation detecting means for detecting a gear change operation of the transmission; and controlling means which, based on detection signals from the gear change operation detecting means, controls the lock-up clutch actuating means so as to engage the lock-up clutch during the gear change operation.

2. A lock-up clutch controlling device of a vehicle driving device as claimed in claim 1, wherein:

the gear change operation detecting means comprises clutch detecting means for detecting an engagement state of the friction clutch, and vehicle speed detecting means for detecting a running speed of the vehicle; and when the friction clutch is disengaged and the running speed of the vehicle is not less than a predetermined speed, based on detection signals from the clutch detecting means and the vehicle speed detecting means, the controlling means judges that the gear change operation is being performed.

3. A lock-up clutch controlling device of a vehicle driving device, the vehicle driving device including an engine installed in a vehicle, a fluid coupling actuated by the engine, and a friction clutch disposed between the fluid coupling and a transmission, the fluid coupling having a lock-up clutch, the lock-up clutch controlling device comprising:

lock-up clutch actuating means for actuating the lock-up clutch;

gear change operation detecting means for detecting a gear change operation of the transmission;

clutch engagement amount detecting means for detecting an amount of engagement of the friction clutch; and controlling means for controlling the lock-up clutch actuating means based on detection signals from the gear change operation detecting means and the clutch engagement amount detecting means; and wherein:

based on the detection signals from the gear change operation detecting means and the clutch engagement amount detecting means, the controlling means engages the lock-up clutch during the gear change operation, and disengages the lock-up clutch when the amount of engagement of the friction clutch has reached a predetermined amount.

4. A lock-up clutch controlling device of a vehicle driving device as claimed in claim 3, wherein:

the gear change operation detecting means comprises the clutch engagement amount detecting means, and vehicle speed detecting means for detecting a running speed of the vehicle; and when the friction clutch is disengaged and the running speed of the vehicle is not less than a predetermined speed, based on detection signals from the clutch engagement amount detecting means and the vehicle speed detecting means, the controlling means judges that the gear change operation is being performed.

5. A lock-up clutch controlling device of a vehicle driving device, the vehicle driving device including an engine installed in a vehicle, a fluid coupling actuated by the engine, and a friction clutch disposed between the fluid coupling and a transmission, the fluid coupling having a lock-up clutch, the lock-up clutch controlling device comprising:

lock-up clutch actuating means for actuating the lock-up clutch;

gear change operation detecting means for detecting a gear change operation of the transmission;

engine revolution speed detecting means for detecting a revolution speed of the engine;

input shaft revolution speed detecting means for detecting a revolution speed of an input shaft of the transmission; and controlling means for controlling the lock-up clutch actuating means based on detection signals from the gear change operation detecting means, the engine revolution speed detecting means, and the input shaft revolution speed detecting means; and wherein:

based on the detection signals from the gear change operation detecting means, the engine revolution speed detecting means, and the input shaft revolution speed detecting means, the controlling means engages the lock-up clutch during the gear change operation, and disengages the lock-up clutch when a difference between the revolution speed of the engine and the revolution speed of the input shaft of the transmission has reached a predetermined amount.

6. A lock-up clutch controlling device of a vehicle driving device as claimed in claim 5, wherein:

the gear change operation detecting means comprises clutch detecting means for detecting an engagement state of the friction clutch, and vehicle speed detecting means for detecting a running speed of the vehicle; and when the friction clutch is disengaged and the running speed of the vehicle is not less than a predetermined speed, based on detection signals from the clutch detecting means and the vehicle speed detecting means, the controlling means judges that the gear change operation is being performed.

* * * * *